United States Patent [19]

Williams

[11] Patent Number: 5,000,721

[45] Date of Patent: Mar. 19, 1991

[54] CLUTCH APPARATUS

[75] Inventor: Jack L. Williams, Orange, Calif.

[73] Assignee: ITT Corporation, New York, N.Y.

[21] Appl. No.: 570,983

[22] Filed: Aug. 23, 1990

Related U.S. Application Data

[63] Continuation of Ser. No. 330,530, Mar. 30, 1989, abandoned, which is a continuation-in-part of Ser. No. 274,637, Nov. 16, 1988, Pat. No. 4,878,880, which is a continuation of Ser. No. 87,579, Aug. 20, 1987, abandoned.

[51] Int. Cl.⁵ .................... F16D 41/12; F16D 11/00
[52] U.S. Cl. ........................................ 464/37; 192/46
[58] Field of Search ............ 74/411, 412 TA; 192/46, 192/56 L, 71, 79; 464/30, 37, 81, 82, 83, 87

[56] References Cited

U.S. PATENT DOCUMENTS

| 1,391,601 | 9/1921 | Zanon | 464/37 |
| 3,200,918 | 8/1965 | Horn | 192/46 |
| 3,335,580 | 8/1967 | Simpson, Jr. | 464/37 X |
| 3,406,583 | 10/1968 | Baier | 464/30 X |
| 3,667,307 | 6/1972 | Kelch | 192/46 X |
| 3,928,862 | 12/1975 | Ivester et al. | 192/46 X |
| 3,932,956 | 1/1976 | Young | 464/37 X |
| 4,006,787 | 2/1977 | Rumpp et al. | 464/37 X |
| 4,570,769 | 2/1986 | Isaka | 192/46 |
| 4,572,041 | 2/1986 | Rissmann | 464/37 X |
| 4,702,122 | 10/1987 | Richard | 464/37 X |

FOREIGN PATENT DOCUMENTS 2022199 12/1979 United Kingdom ................ 464/37

Primary Examiner—Thomas R. Hannon
Attorney, Agent, or Firm—M. J. Lombardi

[57] ABSTRACT

Clutch apparatus with a rotary inner member having a plurality of equally spaced indents. An outer member has a plurality of equally spaced flexible beam members on its inner peripheral surface, each of said members being adapted to engage one of said plurality of indents. When either the inner or outer member is subject to an overload condition, said beam members flex radially outward and slip from one indent to another.

7 Claims, 6 Drawing Sheets

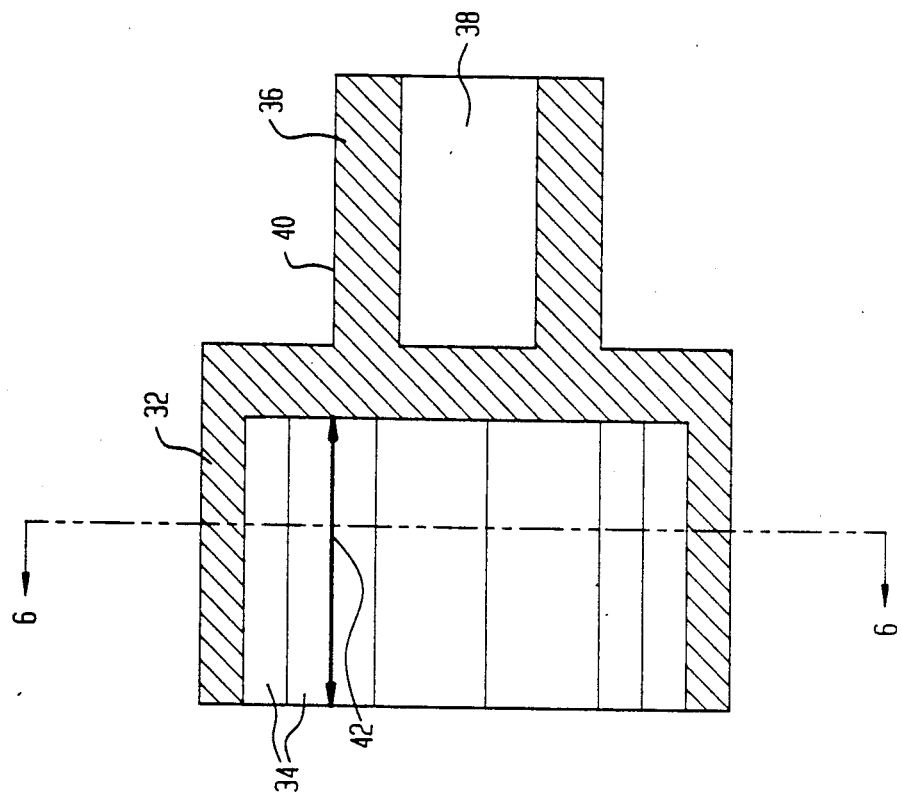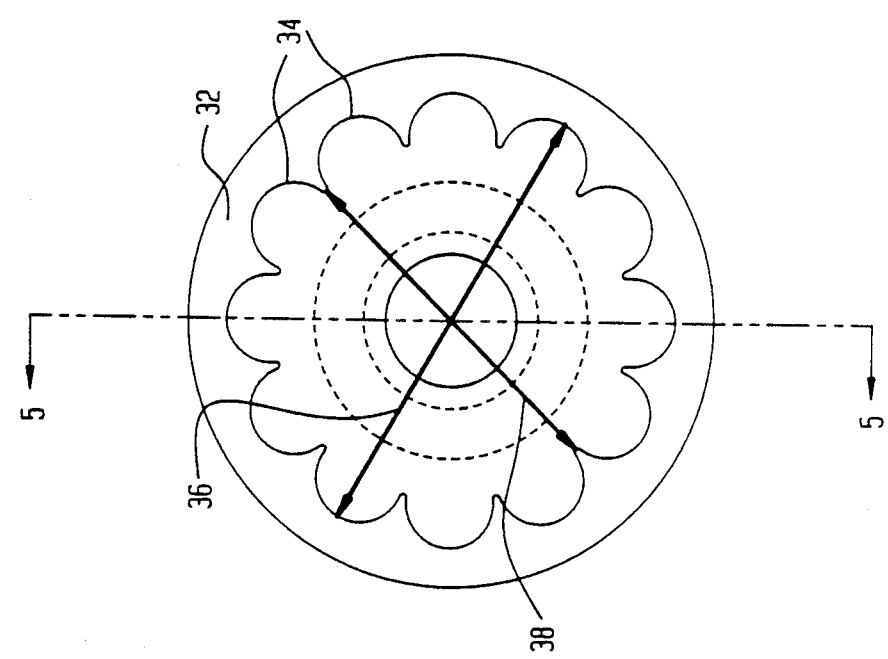

CLUTCH APPARATUS

CROSS-REFERENCE TO RELATED APPLICATIONS

This application is a continuation of U.S. Ser. No. 330,530, filed 03/30/89, now abandoned, which is a continuation-in-part of U.S. Ser. No. 274,637, now U.S. Pat. No. 4,878,880, filed Nov. 16, 1988, which is a continuation of U.S. Ser. No. 087,579, filed Aug. 20, 1987, and now abandoned.

BACKGROUND OF THE INVENTION

This invention relates to improved clutch apparatus, and more particularly to an improved slip or safety clutch.

Most devices of the prior art which perform a similar function to this invention are relatively expensive and require several fabricated parts. Some of these are known as spring loaded clutches or spring loaded clutch couplings. These rely on the pressure of a spring device to maintain force and thus friction between two rotating surfaces. When the value of the design torque is exceeded in operation, the device slips in rotation to protect a mechanism from damage.

The prior art devices, in addition to being complex and expensive for the function performed, rely on the friction between two surfaces to provide slip resistance. The slip resistance value will vary from part to part and from time to time depending on a number of design variables. Further, it is more difficult and expensive to provide for corrosion resistance in these devices when compared to the clutch apparatus of the invention.

Devices are also known which utilize radial deformable members made of rubber, rubber composition, or rubber and fabric composition. These members deform and provide a scraping action resulting in excessive wear of the members and a substantial amount of radial movement. The torque and life capability of such rubber or rubber fabric type composite members is limited.

Still other devices use different spring configurations requiring shimming, hardened U-shaped spring strips, or spring rods which may be center flexed, or with ball and detent type arrangements. None of these devices, however, is suitable for providing a two piece clutch with both a unitarily formed inner and outer member.

In order to overcome the foregoing problems and limitations, an improved slip or safety clutch is hereinafter described.

SUMMARY OF THE INVENTION

Accordingly, it is an object of the present invention to provide clutch apparatus wherein the resistance to rotation is provided by flexible finger or beam members.

Another objective of the invention is to provide a two piece clutch arrangement wherein one piece has flexible finger or beam members and the other piece has cavities or recesses which engage the flexible members, so that when the designed torque is exceeded, the flexible members will slip in the cavities.

An additional object of the invention is to provide clutch apparatus having a rotary inner member with a plurality of flexible beam members, and a rotary outer member with a plurality of cavities which are in coupled engagement with the beam members for rotations, and when a predetermined torque value is exceeded, the beam members slip in the cavities of the outer member.

A still further object of the invention is to provide an improved clutch apparatus in which a rotatable outer member has flexible beam members on its inner periphery to engage cavities on an inner rotatable member, such that when the design torque is exceeded, the flexible beam member will slip in the cavities.

There are many features and advantages in using the clutch apparatus of the invention. For example, the two pieces of the clutch can be molded or fabricated out of corrosion resistant material. The two piece clutch can also be formed as a part of rotating mechanism and aligned along the center of rotation. If a safe or designed torque is exceeded, this clutch apparatus allows a controlled slippage between sections of the rotating mechanism. This clutch maintains the designed resistance to rotation before, during and after slippage takes place.

The improved apparatus of the invention can be used wherever a slip or safety clutch is now used, and in some applications, where known safety or slip clutches cannot now be used.

BRIEF DESCRIPTION OF THE DRAWINGS

Other objects, features and advantages of the present invention will become more fully apparent from the following detailed description of the preferred embodiments, the appended claims and the accompanying drawings in which:

FIG. 4 is an end view of the outer member of the clutch apparatus of the invention;

FIG. 5 is a cross-sectional view of FIG. 4 taken along lines 5—5;

DETAILED DESCRIPTION OF THE PREFERRED EMBODIMENTS

Figure 1:
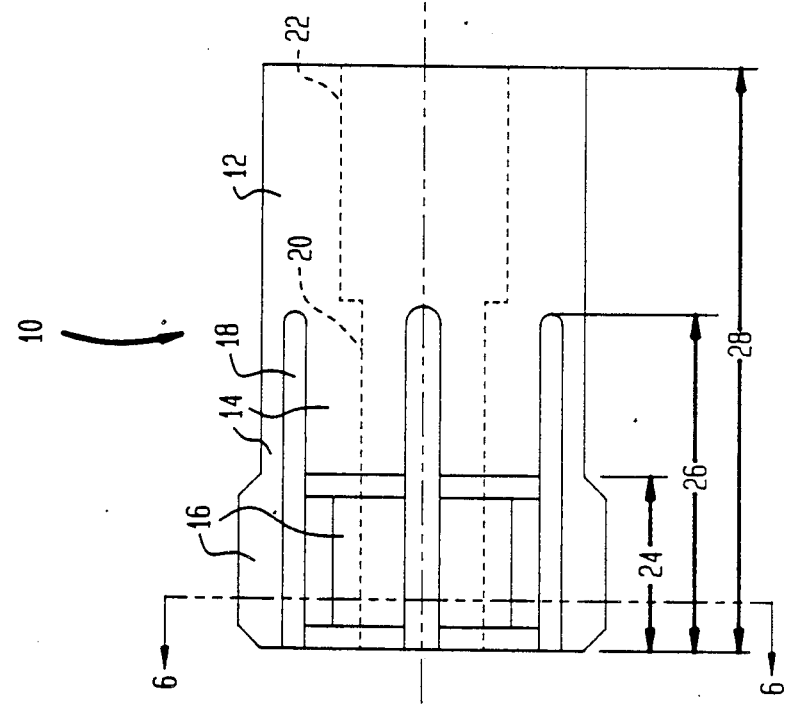
FIG. 1 is a side view of inner member of the clutch apparatus with flexures according to the invention.

With specific reference to FIG. 1, there is shown a male or rotary inner member 10, having a generally cylindrical hub portion 12, and flexible finger shaped or beam members 14. The members 14 have radially extending tooth projections 16. The members 14 are uniformly shaped and separated by equal interdigital spaces 18. The cylindrical inner diameter 20 of the members 14 extends to the hub portion 12. Hub portion 12 has a larger inner diameter 22 for mounting on a drive shaft. The mounting to the shaft may be accomplished by known methods such as using a key, spline, or square coupling. The hub 12 may also be provided with an extension or made integral with a driving gear or shaft.

In one example of the embodiment, the length 24 of tooth projection 16 and the length 26 of beam member 14 had a size ratio of 1:2; and the length 26 had a size ratio of 2:3 to the overall length 28.

Figure 2:
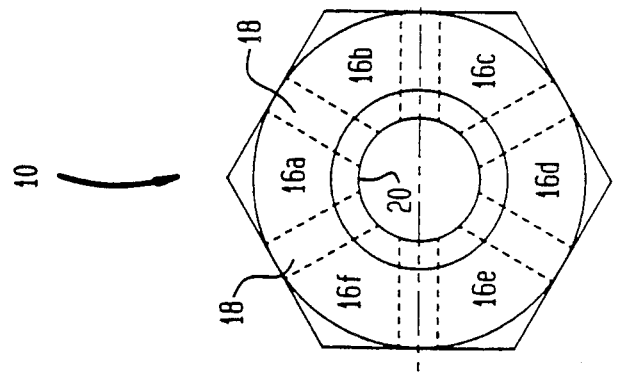
FIG. 2 is a left end view of FIG. 1.

Referring now to FIG. 2, a left end view of member 10 is shown. The tooth projections 16 form six repetitive sections of an array 16a-16f. The six sections of the array have a generally pentagonal shape, but could be formed round, triangular, etc. The overall shape as viewed in FIG. 2 is hexagonal. This could also change depending on the number of beam members and shape of the tooth projections.

The interdigital space 18 and the inner diameter 20 permit inward radial deflection of beam members 14 at the load design point.

Figure 3:
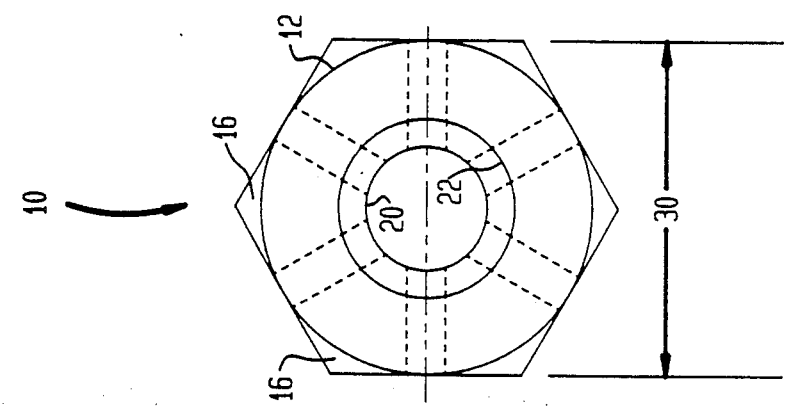
FIG. 3 is a right end view of FIG. 1.

FIG. 3 is a right end view of member 10 shown in FIG. 1. There is illustrated inner diameters 20 22, hub portion 12 and tooth projections 16. In the example of the embodiment previously referenced in connection with FIG. 1, outer diameter 30 of hub 12 had a size ratio of 1:2 to the inner diameter 20.

Referring now to FIG. 4, there is shown a female, or rotary outer member 32 having twelve cavities, recesses, or detents 34 which are complementary and engage the tooth projections as herein after shown. The maximum diameter 36 of a cavity 34 is always less than the maximum outer diameter of the tooth projections 16. The minimum inner diameter 38 must relate to the amount of desired beam member deflection (preload condition), as assembled.

In FIG. 5, a cross-sectional view of the outer member 32 taken along line 5—5 of FIG. 4. The outer member 32 has a mounting hub portion 36 for mounting a shaft in cylindrical cavity 38, or a gear on surface 40 of hub 36. The shaft or gear to be driven may be mounted in several known ways, or the member 32 may be made integral with the driven shaft or gear or structure. The length 42 of cavities 34 must extend at least a length 24 equal to tooth projection length 16.

Figure 6:
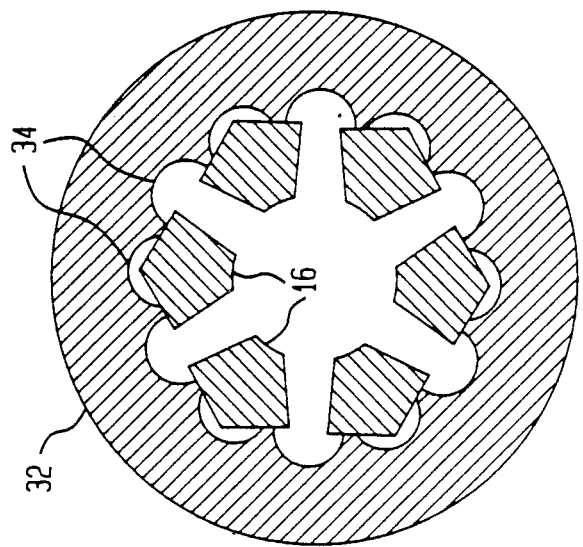
FIG. 6 shows in a cross-sectional view the engagement of the inner and outer members as taken along lines 6—6 in FIGS. 1 and 5.

FIG. 6 shows in a combination cross-sectional view the engagement of the inner member tooth projections 16 engage alternate cavities 34, both members being made of metal. The combination cross-sectional view was taken along lines 6—6 of FIGS. 1 and 5. The six tooth projections 16 engage alternate cavities 34. The rotary inner member 10 through the tooth projections 16 drive the outer member 32 until the load on the outer member 32 is increased or the outer member 32 movement locked or prevented. Thereupon, the flexible finger shaped or beam members will flex inwardly toward the center and the tooth projections will shift or slip to the next adjacent cavity. This slippage will continue without damage to the outer or inner member until the drive power through the inner member is stopped. This simple but effective slipping clutch apparatus will thus protect the connecting drive and output mechanisms.

In order to appreciate the application size and material possibilities of the invention, and using the ratios discussed, a member 10 having approximately a length 28 of 0.75 inches, a length 26 of 0.50 inches, a length 24 of 0.25 inches, a diameter 30 of 0.50 inches, and a diameter 20 of 0.25 inches was fabricated from an acetal plastic. The outer member 32 having approximately an outer diameter of 0.75 inches, a length 42 of 0.375 inches, and the maximum cavity diameter of 0.565 inches was fabricated from an acetal plastic. With the size and material described, the clutch apparatus will provide 5 to 10 inch ounces of torque.

If a similar size male and female member is fabricated with steel, the resulting apparatus will produce 20 to 30 times greater torque. If one member is made of steel and one of plastic, the resulting torque will be less than an all steel combination and greater than an all plastic combination. It has also been discovered that the torque capability can be controlled by the stiffness of the beam members 14.

An advantage of this apparatus is that it can be made inexpensively by molding from a plastic material. Such a configuration would be corrosion resistant and could be used in a corrosive environment. Of course, the parts could be made from a suitable stainless steel or other metal alloy and provide corrosive resistance.

Figure 7:
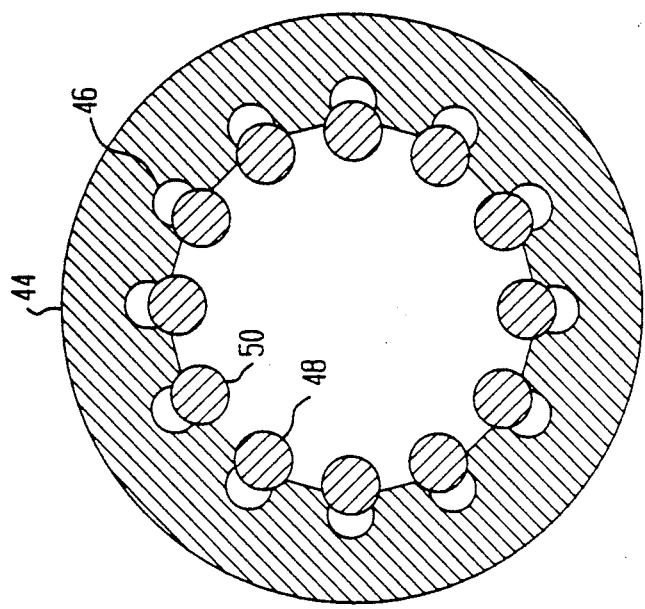
FIG. 7 shows a cross-sectional view of the inner and outer members in a different complementary configuration from that shown in FIG. 6.

Referring now to FIG. 7, another type configured outer member 44 is shown having deeper cavities, recesses or detents 46. In this configuration, the complementary tooth projections 48 have a rounded tooth engaging area 50 to correspond to the deeper cavities 46.

It should be understood by those skilled in the art that while I have shown and described six flexible finger members and twelve cavities in a one to two correspondence of inner to outer members, this invention can be practiced using a 1:1, 1:3, 1:4, etc., depending on the design requirements. It should also be evident that the flexible finger or beam members can be made with two or more elements depending on the design requirements. An even number is not required, but has been used to facilitate machining of the inner members. In a molded part, this would not be a problem and an odd number of flexible finger members could be utilized. The outer member would then have the appropriate correspondence of cavities as hereinbefore described.

It is further contemplated and should be apparent to those skilled in the art, that the outer member could be configured with the flexible finger beam members and the inner member configured with the cavity or detents on its outer surface.

Figure 8:
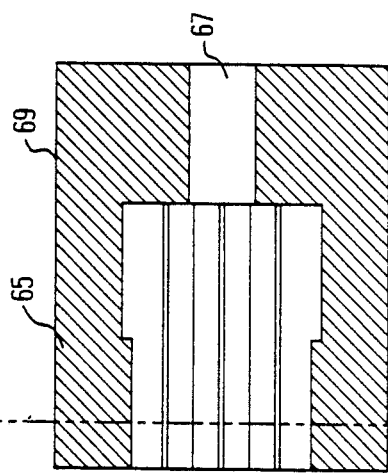
FIG. 8 shows a cross-sectional view of a member having the flexible fingers on the outer or female portion of the clutch assembly.

Referring now to FIG. 8, an outer member 69 is shown having flexible fingers 65 that flex outwardly when the design torque is exceeded. The slots 68 between the fingers allow individual movement of the fingers. A hole 67 is provided in the hub portion of the member to facilitate attachment to a shaft or other rotating member. The hole 67 can be of any size and shape to accommodate application or design needs. The hub portion 69 could also be integral with a rotating member of a mechanism.

Figure 9:
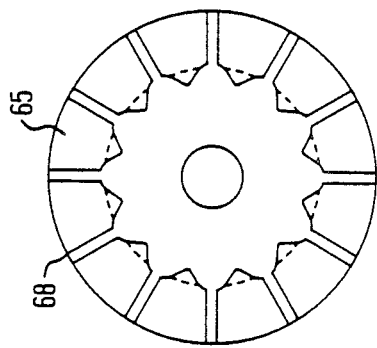
FIG. 9 is an end view of FIG. 8.

FIG. 9 shows an end view of the member in FIG. 8. The shapes, dimensions and number of fingers 65 are intended to represent general types and these parameters would normally be chosen to accommodate particular design needs. The slots 68, between the fingers flexing outwardly, can be much narrower in this configuration than in the configuration where the fingers flex inwardly.

Figure 10:
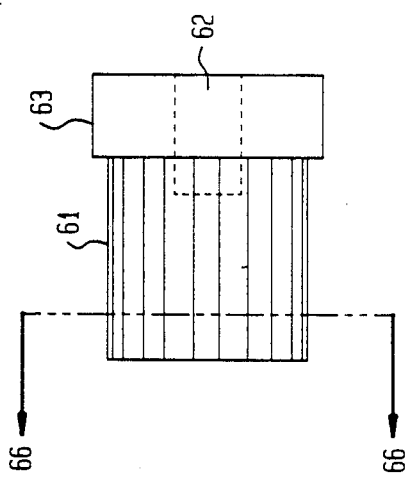
FIG. 10 is a side view of an inner or male member having cavities that would interact with the fingers on the member shown in FIG. 8.
Figure 11:
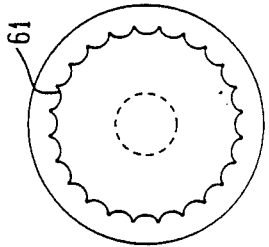
FIG. 11 is an end view of FIG. 10.

Referring now to FIG. 10, a side view is shown of an inner male member 63 that corresponds to the female, outer member shown in FIGS. 8 and 9. The diameter of the hub portion of the member 63, is shown larger than the diameter of the cavity portion. This is arbitrary and actual designs could embody a hub portion that has a smaller diameter than the cavity portion or, the hub portion could be omitted. A hole 62 is shown as a possible means of attaching the member 63 to a shaft or other rotating element of a mechanism. The hole 62 could be omitted and the cavity portion 61 could be formed integrally with a rotating element of a mechanism. A boss or protrusion could also serve the function of attachment to a shaft or rotating member. FIG. 11 is an end view of FIG. 10.

Figure 12:
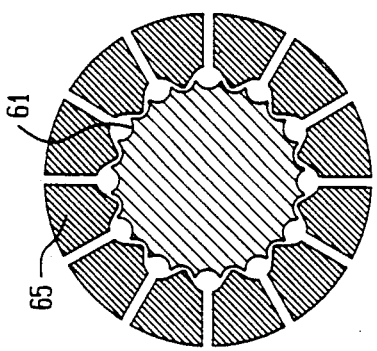
FIG. 12 is a cross-sectional view of the male part shown in FIG. 10 assembled to the female part shown in FIG. 8, the section is in the plane indicated by the arrows 66.

Referring to FIG. 12, a cross-sectional view is shown, generally through a plane shown by the arrows 66 in FIGS. 8 and 10. This cross section illustrates the engagement of the fingers 65 of member 69 with the cavities 61 of member 63. The assembly would rotate as a force transmitting section of a shaft or assembly until a design torque was exceeded. When the design torque is exceeded, the fingers 65 flex outwardly and the outer member 69 rotates (slips) with respect to the inner member 63. The fingers 65 snap into the next cavities in the inner member 63, in the direction of rotation without damage to the mechanism. This action would be repeated in a ratchetting manner until the excessive torque was reduced to a value within the design limits. This action would be the same in either direction of the rotation in the example shown but the shape of the members could be designed so that the maximum torque design point in one direction of rotation was different than the maximum torque design point in the other direction.

Figure 13:
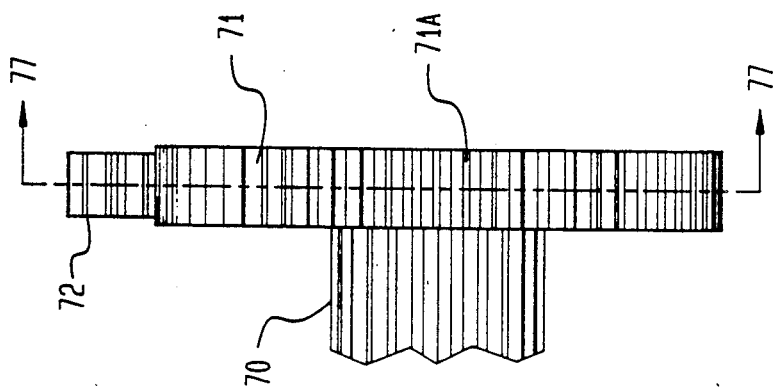
FIG. 13 is a side view of the inner or male member engaged with a driven outer or female member of the improved clutch.
Figure 14:
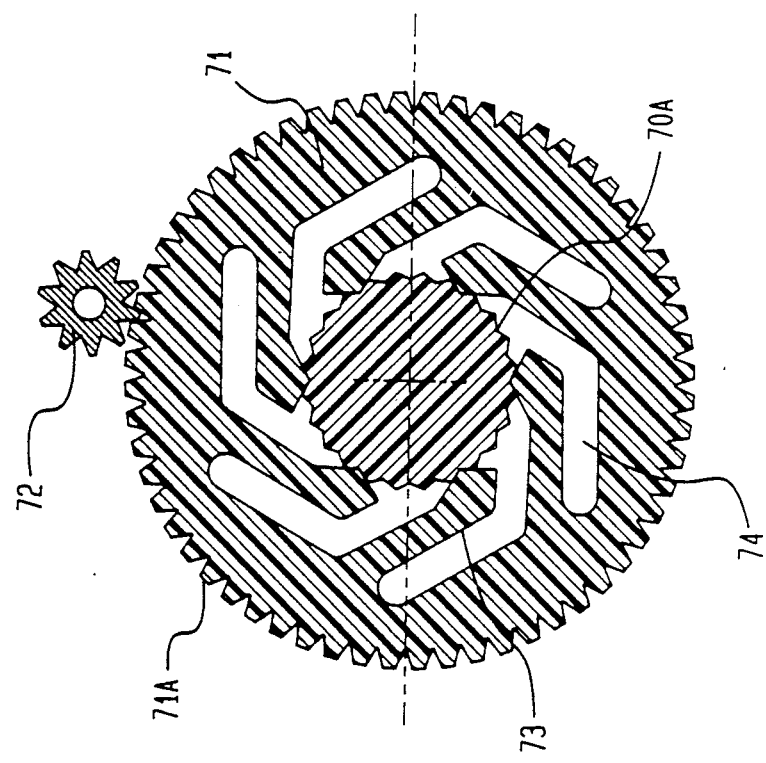
FIG. 14 shows a cross-sectional view of the engagement of the inner and outer members, the section is in the plane indicated by the arrows 77.

FIG. 13 is side view of inner or male member 70, engaging with outer or female member 71. A driving or driven gear 72 engages the teeth 71A located on the periphery of member 71. Referring now to FIG. 14, a cross-sectional view is shown, generally through a plane shown by arrows 77 in FIG. 13. This cross-section illustrates the engagement bY the teeth projections of flexible beam members 73 with the cavities or indents 70A on inner member 70. The inner and outer members will rotate as an assembly until the design torque is exceeded. When the design torque is exceeded, the members 73 flex outwardly into the interdigital space 74 and the outer member 71 rotates (slips) with respect to the inner member 70. The teeth projections of flexible beam members 73 which snap into the next cavities or indents 70A in the direction of rotation without damage to the input or output mechanism which may be connected to the inner or outer member, or to gear 72. This slipping action would be repeated in a ratchetting manner until the excessive torque is reduced to a value within the design limits. The described and illustrated configuration is bidirectional. In the shown preferred embodiment, the inner and outer members, as well as the gear, were injection molded from an acetal plastic. As such, it provides a low cost, light weight, rust free, two piece slip clutch which is efficient and highly reliable.

An additional advantage of this improved clutch and configuration, is that it may also be machine fabricated in one piece from metal, so that one or both members may be made from metal depending on the torque requirements.

Figure 16:
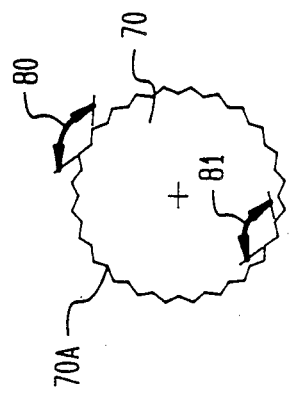
FIG. 16 illustrates in outline form the inner or male member of FIGS. 13 and 14.
Figure 15:
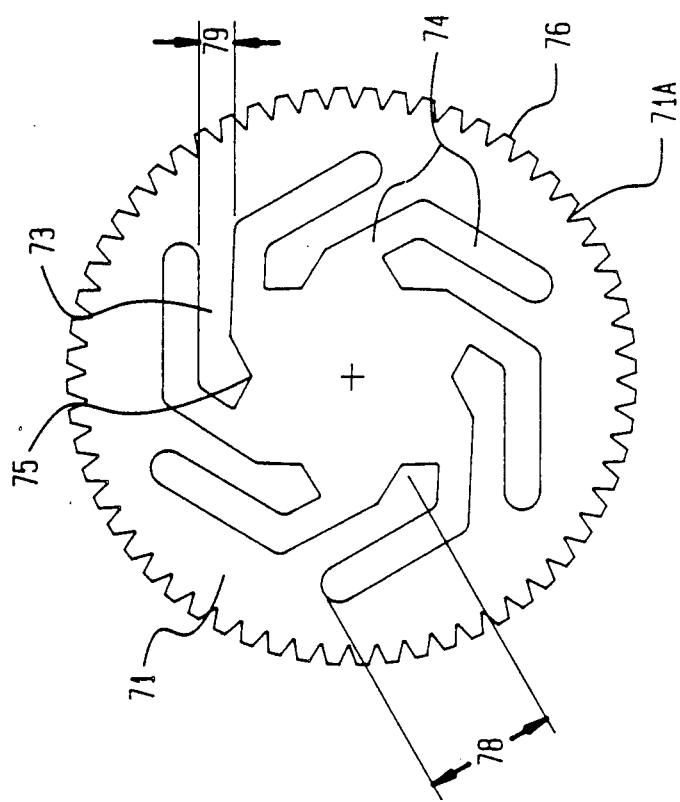
FIG. 15 illustrates in outline form the outer or female member of FIGS. 13 and 14.

Referring to FIGS. 15 and 16, the outer female member 71 and inner male member 70 are shown in outline form to further illustrate the features of the invention. Member 71, FIG. 15, illustrates six flexible beam members 73, each having a tooth portion 75. The interdigital space 74 is V-shaped and provides deflection clearance within the body of the outer member 71. The outer diameter of member 71 does not change which makes it suitable for providing gear teeth 71A. The length 78 of the beam member 73 is related to the thickness 79 in a 5:1 ratio, in this example.

Inner member 70, FIG. 16, has twenty-four indents 70A. The profile of tooth projection 75 matches the profile of the indents 70A. The illustrated preferred embodiment, angle 80 has a value of approximately 130°, and angle 81 has a value of approximately 115°. The diameter of a tooth projection 75 and root diameter of an indent 70A has, preferably an interference fit of approximately 0.02 inches to insure firm rotary coupling between the inner and outer members.

Although twenty-four indents are described with six flexible beam members, other combinations as herein before described may be used in keeping with the teachings of this disclosure.

While the present invention has been disclosed in connection with the preferred embodiments hereof, it should be understood that there may be other embodiments which fall within the spirit and scope of the invention as defined by the following claims.

I claim:

1. The combination comprising:
   a unitarily formed rotary female member for bidirectional rotation having a plurality of equally spaced flexible beam members about its inner peripheral surface and gear teeth about its outer circumference, each said beam member being straight and angularly projecting inward from the surface and including a tooth projection directed radially inward;
   a rotary male member for bidirectional rotation having a plurality of equally spaced cavities on the outer peripheral surface, each said cavity adapted to be engaged and driven by said tooth projection until an overload condition which causes each of the beam members to flex radially outwardly into an interdigital space formed in the female member, whereby the tooth projections slip in a ratchetting manner from cavity to cavity when said female member is driven in either direction of rotation; and
   a gear engaging the gear teeth on the outer circumference of said female member.

2. In combination, a bidirectional two piece slip clutch molded from plastic comprising:
   an inner rotary member for bidirectional rotation having a plurality of equally spaced recesses on its outer periphery;
   an outer rotary ring member having a plurality of equally spaced straight beams which are flexible in a radial direction and angularly projecting form the inner circumference of said ring member for coupling engagement with said recesses, and each said beams having a shaped portion for engagement with said recesses and for slipping in either direction of rotation at a predetermined limit; and
   said outer rotary ring member including a V-shaped interdigital space for each said plurality of beams to provide spacing for the outward radial flexing of said beams.

3. Bidirectional slip clutch apparatus comprising:
an inner rotary member for bidirectional rotation having a plurality of axially extending indents; and
an outer rotary member for bidirectional rotation having a plurality of flexible beam members, equally spaced and separated by an interdigital spaced to provide deflection clearance on the interior peripheral surface, said beam members being straight and angularly projecting inward from the surface for radially engaging said indents for rotational coupling, and said beam members being radially deflectable inward outward from the inner circumferential surface so as to flex out of engagement with said indents when said inner or outer rotary member exceeds in either direction of rotation a predetermined condition.

4. Apparatus as claimed in claim 3, wherein each said beam members has a length to thickness ratio of 5:1.

5. Apparatus as claimed in claim 4, wherein said inner and outer members are unitarily molded plastic members.

6. Apparatus as claimed in claim 5, wherein said outer member has six extending beam members.

7. Apparatus as claimed in claim 6, wherein said inner member has twenty-four equally spaced indents.

* * * * *